United States Patent
Woo et al.

(10) Patent No.: US 10,169,273 B2
(45) Date of Patent: Jan. 1, 2019

(54) FORCED COMPRESSION OF SINGLE I2C WRITES

(71) Applicant: QUALCOMM Incorporated, San Diego, CA (US)

(72) Inventors: Inyoung Woo, San Diego, CA (US); Young Hoon Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/403,559

(22) Filed: Jan. 11, 2017

(65) Prior Publication Data

US 2018/0196770 A1 Jul. 12, 2018

(51) Int. Cl.
 *G06F 13/364* (2006.01)
 *G06F 13/42* (2006.01)
 *G06F 13/40* (2006.01)

(52) U.S. Cl.
 CPC .......... *G06F 13/364* (2013.01); *G06F 13/404* (2013.01); *G06F 13/4282* (2013.01); *G06F 13/4291* (2013.01)

(58) Field of Classification Search
 None
 See application file for complete search history.

(56) References Cited

U.S. PATENT DOCUMENTS

| | | | |
|---|---|---|---|
| 6,591,322 B1 | 7/2003 | Ervin et al. | |
| 6,970,966 B2 * | 11/2005 | Gemelli | G06F 17/5045 |
| | | | 710/305 |
| 7,373,444 B2 * | 5/2008 | Asano | G06F 13/42 |
| | | | 710/110 |
| 7,849,246 B2 | 12/2010 | Konishi et al. | |
| 7,925,804 B2 * | 4/2011 | Nara | G06F 13/4059 |
| | | | 710/52 |
| 9,317,466 B2 * | 4/2016 | Debendra | G06F 11/3041 |

(Continued)

FOREIGN PATENT DOCUMENTS

WO 9936849 A1 7/1999

OTHER PUBLICATIONS

International Search Report and Written Opinion—PCT/US2018/013107—ISA/EPO—dated Apr. 11, 2018.

*Primary Examiner* — Michael Sun
(74) *Attorney, Agent, or Firm* — Loza & Loza LLP

(57) ABSTRACT

Systems, methods, and apparatus are described that enable a physical layer interface of a device coupled to a serial bus to combine two or more single-byte write transactions to obtain a multi-byte write transaction. A method includes buffering a first single-byte transaction addressed to a first register at a first address of a slave device in a first-in-first-out buffer of the physical layer, receiving at the physical layer a second single-byte transaction addressed to a second register at a second address of the slave device coupled to the serial bus, determining in the physical layer whether the second address is incrementally greater than the first address, combining the second single-byte transaction with the first single-byte transaction to obtain a multi-byte transaction, replacing the first single-byte transaction with the multi-byte transaction in the first-in-first-out buffer, and transmitting a sequence of transactions output by the first-in-first-out buffer over the serial bus.

28 Claims, 14 Drawing Sheets

(56) References Cited

U.S. PATENT DOCUMENTS

| | | | |
|---|---|---|---|
| 9,336,167 | B2 | 5/2016 | Danis et al. |
| 9,361,306 | B1 * | 6/2016 | Pawar ............... G06F 17/30168 |
| 9,460,019 | B2 * | 10/2016 | Debbage ............. G06F 12/0875 |
| 2003/0110344 | A1 * | 6/2003 | Szczepanek ...... H04L 12/40013 |
| | | | 711/100 |
| 2006/0095609 | A1 | 5/2006 | Radhakrishnan et al. |
| 2007/0240011 | A1 | 10/2007 | Saripalli et al. |
| 2008/0126641 | A1 | 5/2008 | Irish et al. |
| 2011/0078393 | A1 | 3/2011 | Lin |
| 2013/0179753 | A1 * | 7/2013 | Flynn ................. G06F 12/0253 |
| | | | 714/773 |
| 2014/0115219 | A1 * | 4/2014 | Ajanovic ............... A47K 7/028 |
| | | | 710/305 |
| 2014/0281052 | A1 * | 9/2014 | Debendra ............... H04L 47/41 |
| | | | 710/19 |

\* cited by examiner

1

FORCED COMPRESSION OF SINGLE I2C WRITES

TECHNICAL FIELD

The present disclosure relates generally to an interface between processing circuits and peripheral devices and, more particularly, to improving transmission efficiencies by modifying physical layer protocols used to control a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the $I^2C$ bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, the protocols used on an I3C bus derives certain implementation aspects from the I2C protocol. Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation. Other protocols, such as the I3C protocol, can increase available bandwidth on the serial bus through higher transmitter clock rates, by encoding data in signaling state of two or more wires, and through other encoding techniques. Certain aspects of the I3C protocol are derived from corresponding aspects of the I2C protocol, and the I2C and I3C protocols can coexist on the same serial bus.

Increased numbers and complexity of applications can produce uncoordinated streams of data arriving at the physical layer of a serial data bus interface that may result in increased overhead and reduced throughput. Accordingly, improvements are continually needed to improve data throughput and provide reduce overheads associated with serial buses operated in accordance with I2C, I3C, and other protocols.

SUMMARY

Certain aspects of the disclosure relate to systems, apparatus, methods and techniques that adapt a physical layer interface of a master device coupled to a serial bus such that the physical layer interface can combine two or more single-byte write transactions to obtain a multi-byte write transaction.

In various aspects of the disclosure, a method performed in a physical layer interface of a device coupled to the serial bus includes buffering a first single-byte transaction addressed to a first register at a first address in a slave device coupled to the serial bus in a first-in-first-out buffer of the physical layer, receiving at the physical layer a second single-byte transaction addressed to a second register at a second address in the slave device coupled to the serial bus, determining in the physical layer whether the second address is incrementally greater than the first address, combining the second single-byte transaction with the first single-byte transaction to obtain a multi-byte transaction, replacing the first single-byte transaction with the multi-byte transaction in the first-in-first-out buffer, and transmitting a sequence of transactions output by the first-in-first-out buffer over the serial bus.

In some aspects, the physical layer interface may receive a third single-byte transaction addressed to a third register at a third address in the slave device, determine whether the third address is incrementally greater than the second address, combine the third single-byte transaction with the multi-byte transaction to obtain an updated multi-byte transaction, and replace the multi-byte transaction with the updated multi-byte transaction in the first-in-first-out buffer.

In one aspect, the second single-byte transaction may be combined with the first single-byte transaction by extracting a data byte from the second single-byte transaction, and appending the data byte to the first single-byte transaction.

In certain aspects, the serial bus is operated in accordance with an I2C protocol.

In some aspects, the method includes initiating a request for data when an occupancy level of the first-in-first-out buffer falls below a threshold occupancy level. The request for data may be initiated by issuing a bus request to a direct memory access controller. The request for data may be initiated by asserting an interrupt request.

In various aspects of the disclosure, an apparatus adapted or configured to implement a physical layer of a serial interface. The apparatus may include a first-in-first-out buffer, a first register configured to receive single-byte transactions to be transmitted over a serial bus, a second register configured to output a copy of an output transaction stored in the first-in-first-out buffer, a comparator configured to determine when the output transaction is directed to a first address in a slave device coupled to the serial bus and the first single-byte transaction is directed to a second address in the slave device that is incrementally greater than the first address, and a compressor. The compressor may be configured to generate an updated output transaction by combining the output transaction with the first single-byte transaction, and cause the output transaction in the first-in-first-out buffer to be replaced by the updated output transaction. The apparatus may include a transmitter configured to transmit a sequence of transactions output by the first-in-first-out buffer in signaling on the serial bus.

In one example, the compressor is configured to extract a data byte from the second single-byte transaction, and append the data byte to the first single-byte transaction to obtain the updated output transaction.

In one example, the compressor is configured to generate a second updated output transaction by combining the updated output transaction with a third single-byte transaction when the comparator has determined that the third single-byte transaction is addressed to a third register at a third address in the slave device that is incrementally greater than the second address, and cause the output transaction in the first-in-first-out buffer to be replaced by the second updated output transaction.

In some examples, the serial bus is operated in accordance with an I2C protocol.

In certain examples, the apparatus includes a direct memory access circuit configured to initiate a request for data when an occupancy level of the first-in-first-out buffer falls below a threshold occupancy level. The request for data may include a bus request to a direct memory access controller. The request for data may include an interrupt request.

In various aspects of the disclosure, an apparatus has means for buffering single-byte transactions addressed to one or more slave devices coupled to a serial bus, the means for buffering including a first-in-first-out buffer in a physical layer interface adapted to couple the apparatus to the serial bus. The apparatus may have means for determining whether two or more consecutive single-byte transactions received by the means for buffering are addressed to consecutive register addresses in a first slave device coupled to the serial bus, means for combining the two or more consecutive single-byte transactions to obtain a multi-byte transaction, and means for transmitting the multi-byte transaction over the serial bus.

In one aspects, the means for buffering is configured to replace at least one of the two or more consecutive single-byte transactions in the first-in-first-out buffer with the multi-byte transaction.

In one aspect, the means for combining the two or more consecutive single-byte transactions is configured to retrieve a first transaction stored in the first-in-first-out buffer, append a data byte from at least one of the two or more consecutive single-byte transactions to the first transaction to obtain the multi-byte transaction, and store the multi-byte transaction in the first-in-first-out buffer.

In some examples, the serial bus may be operated in accordance with an I2C protocol.

In certain aspects, the apparatus includes means for initiating a request for data when an occupancy level of the first-in-first-out buffer falls below a threshold occupancy level. The means for initiating the request for data may be configured to issue a bus request to a direct memory access (DMA) controller, and/or assert an interrupt request.

In various aspects of the disclosure, a processor-readable storage medium is disclosed. The storage medium may be a non-transitory storage medium and may store code and/or instructions that, when executed by one or more processors, causes the one or more processors to perform one or more of the processes and/or methods disclosed herein.

In one example, the one or more processors may be provided as a controller, sequencer, state machine and/or other combinational logic in a physical layer of a device coupled to a serial bus, and the storage medium may store code that causes the one or more processors to buffer a first single-byte transaction addressed to a first register at a first address in a slave device coupled to the serial bus in a first-in-first-out buffer of the physical layer, receive at the physical layer a second single-byte transaction addressed to a second register at a second address in the slave device coupled to the serial bus, determine in the physical layer whether the second address is incrementally greater than the first address, combine the second single-byte transaction with the first single-byte transaction to obtain a multi-byte transaction, replace the first single-byte transaction with the multi-byte transaction in the first-in-first-out buffer, and transmit a sequence of transactions output by the first-in-first-out buffer over the serial bus.

In various aspects the processor-readable storage medium stores one or more instructions which, when executed by at least one processor of a processing circuit, cause the at least one processing circuit to buffer a first single-byte transaction addressed to a first register at a first address in a slave device coupled to the serial bus in a first-in-first-out buffer of the physical layer interface, receive at the physical layer interface a second single-byte transaction addressed to a second register at a second address in the slave device coupled to the serial bus, determine in the physical layer interface whether the second address is incrementally greater than the first address, combine the second single-byte transaction with the first single-byte transaction to obtain a multi-byte transaction, replace the first single-byte transaction with the multi-byte transaction in the first-in-first-out buffer, and transmit a sequence of transactions output by the first-in-first-out buffer over the serial bus.

In one aspect the storage medium stores instructions that cause the at least one processing circuit to receive at the physical layer interface a third single-byte transaction addressed to a third register at a third address in the slave device, determine in the physical layer interface whether the third address is incrementally greater than the second address, combine the third single-byte transaction with the multi-byte transaction to obtain an updated multi-byte transaction, and replace the multi-byte transaction with the updated multi-byte transaction in the first-in-first-out buffer.

In one aspect, the storage medium stores instructions that cause the at least one processing circuit to extract a data byte from the second single-byte transaction, and append the data byte to the first single-byte transaction.

In some examples, the serial bus is operated in accordance with an I2C protocol.

In certain aspects, the storage medium stores instructions that cause the at least one processing circuit to initiate a request for data when an occupancy level of the first-in-first-out buffer falls below a threshold occupancy level. The storage medium may store instructions that cause the at least one processing circuit to issue a bus request to a DMA controller to initiate a transfer of data, and/or assert an interrupt request to initiate a transfer of data.

DETAILED DESCRIPTION

Figure 1:
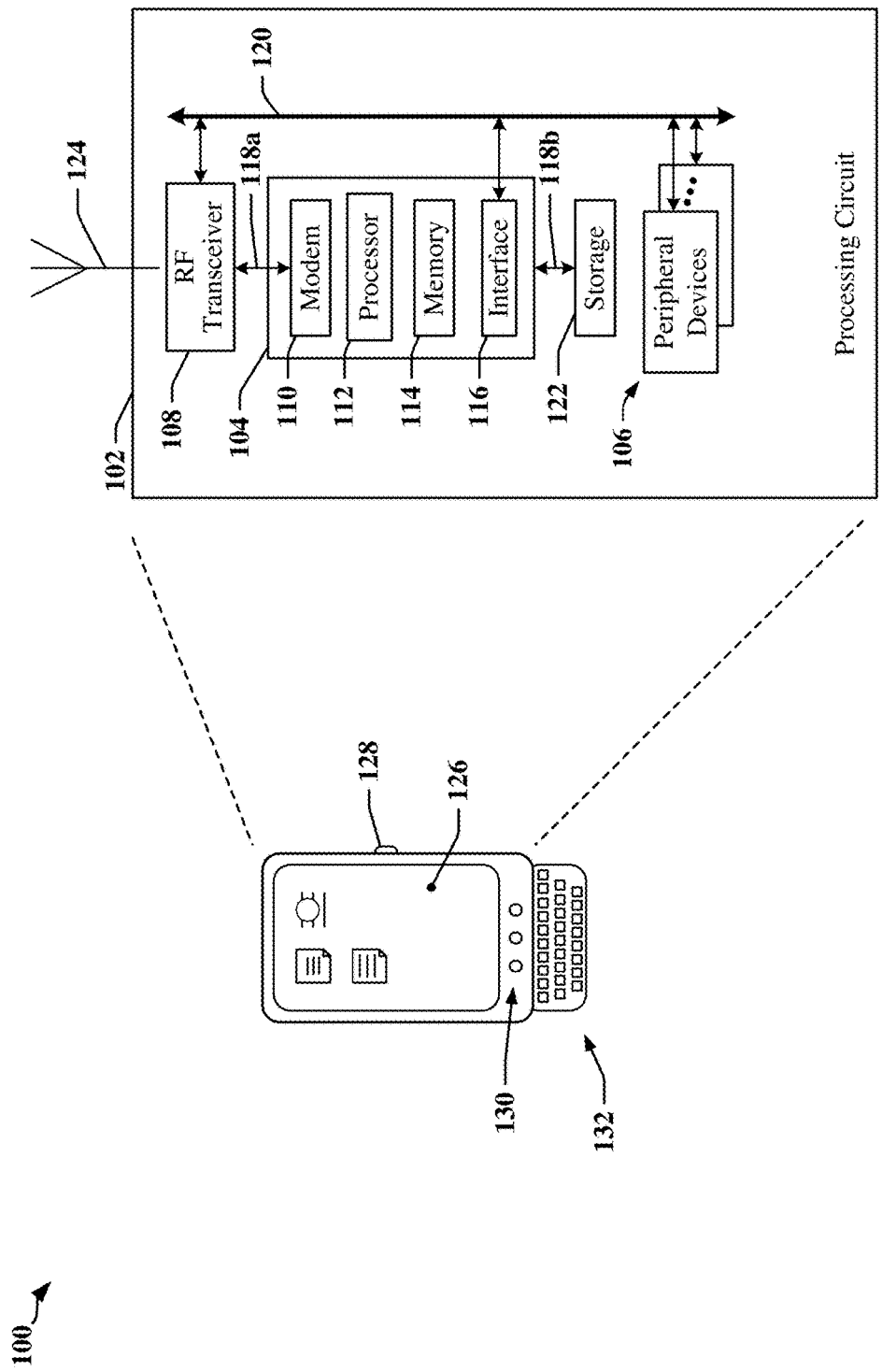
FIG. 1 illustrates an apparatus employing a data link between IC devices.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. In one example, the serial bus may be operated in accordance with I2C protocols that define timing relationships between signals and transmissions. Certain aspects of the disclosure relate to systems, apparatus, methods and techniques that adapt a physical layer interface of a master device coupled to a serial bus such that the physical layer interface can combine two or more single-byte write transactions to obtain a multi-byte write transaction.

In various aspects of the disclosure, a method performed in a physical layer interface of a device coupled to the serial bus includes buffering a first single-byte transaction addressed to a first register at a first address in a slave device coupled to the serial bus in a first-in-first-out buffer of the physical layer, receiving at the physical layer a second single-byte transaction addressed to a second register at a second address in the slave device coupled to the serial bus, determining in the physical layer whether the second address is incrementally greater than the first address, combining the second single-byte transaction with the first single-byte transaction to obtain a multi-byte transaction, replacing the first single-byte transaction with the multi-byte transaction in the first-in-first-out buffer, and transmitting a sequence of transactions output by the first-in-first-out buffer over the serial bus.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
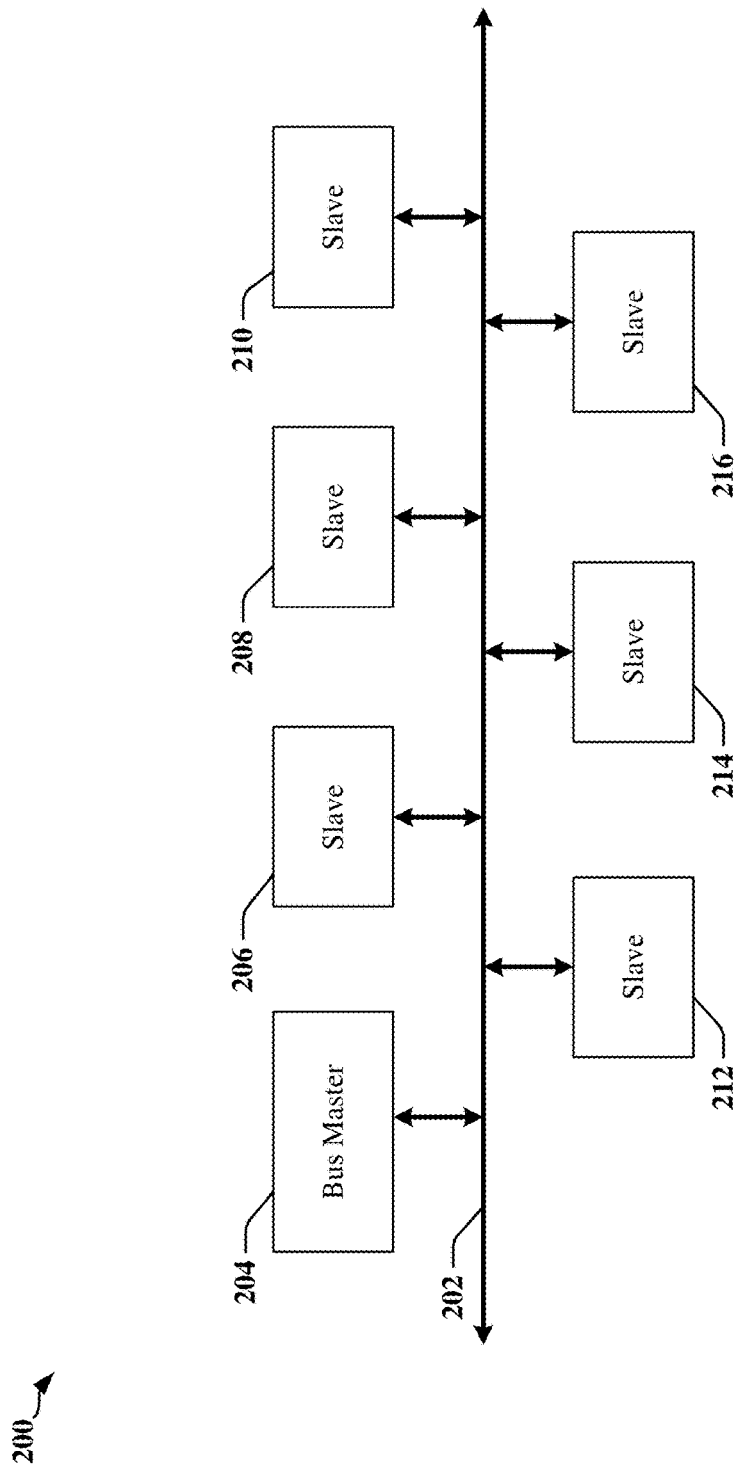
FIG. 2 illustrates a configuration of devices coupled to a common serial bus.

FIG. 2 illustrates a configuration 200 of devices 204, 206, 208, 210, 212, 214 and 216 connected to a serial bus 202. The devices 204, 206, 208, 210, 212, 214 and 216 may be adapted or configured to communicate using one or more protocols. In one example, the devices 204, 206, 208, 210, 212, 214 and 216 may communicate in accordance with an I2C protocol. In another example, the devices 204, 206, 208, 210, 212, 214 and 216 may obtain higher data transfer rates over the serial bus 202 by communicating in accordance with an I3C protocol. In some instances, multiple protocols may coexist on the serial bus 202. Certain of the devices 204, 206, 208, 210, 212, 214 and 216 may communicate using different protocols for different transactions. In various examples, each of the devices 204, 206, 208, 210, 212, 214 and 216 may be configured to communicate over the serial bus 202 using an I2C protocol as desired or needed, while some portion of the devices 204, 206, 208, 210, 212, 214 and 216 can communicate using one another using an I3C protocol as desired or needed. In one example, the serial bus 202 may be operated at higher data transfer rates when a master device 204 operates as an I3C bus master when controlling the serial bus 202. In some examples, a single master device 204 may serve as a bus master in I2C mode and in an I3C mode that supports a data transfer rate that exceeds the data transfer rate achieved when the serial bus 202 is operated according to a conventional I2C protocol. The signaling used for higher data-rate traffic may take advantage of certain features of I2C protocols such that the higher data-rate traffic can be carried over the serial bus 202 without compromising the functionality of legacy I2C devices coupled to the serial bus 202.

Figure 3:
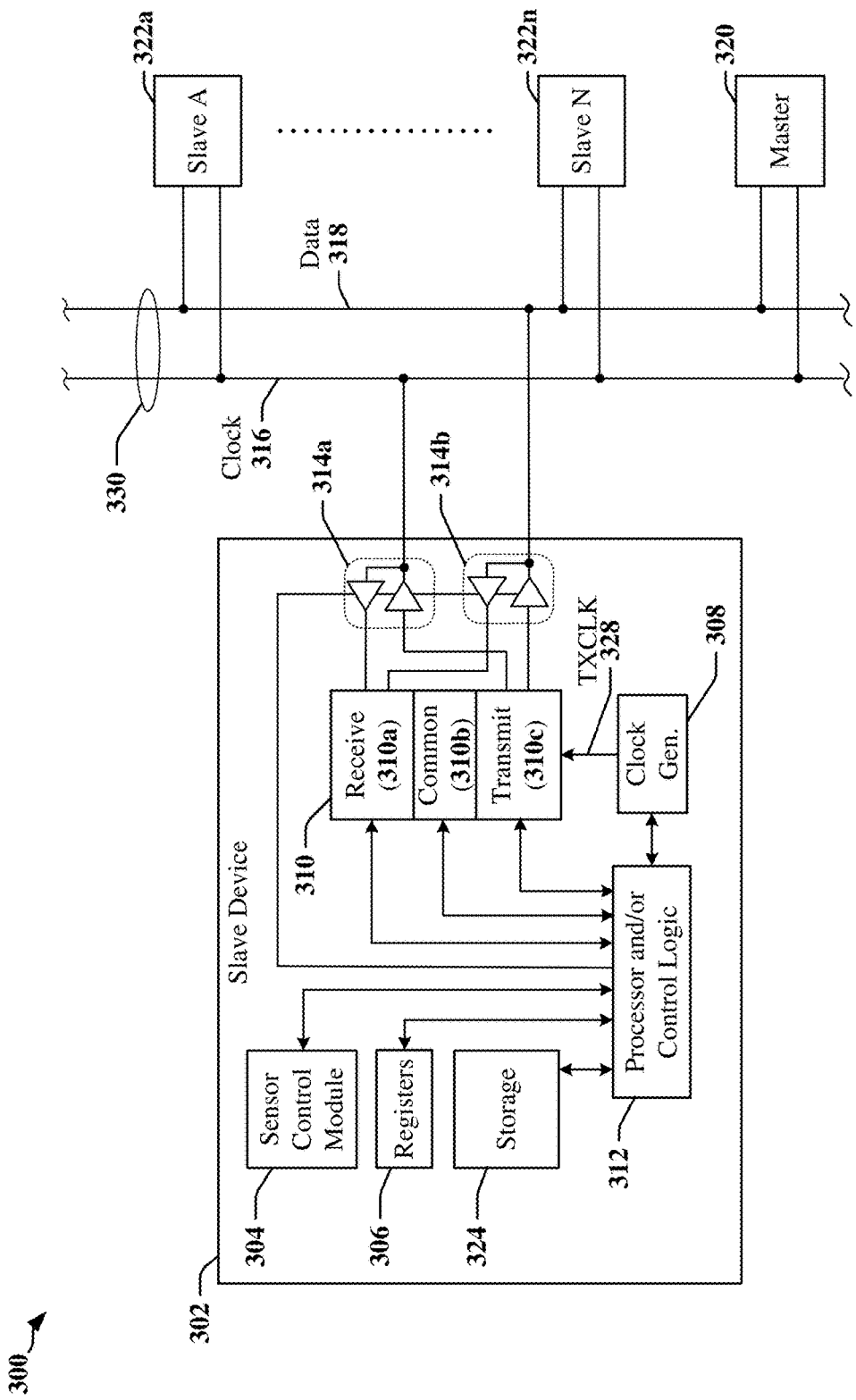
FIG. 3 illustrates certain aspects of an apparatus that includes multiple devices connected to a serial bus.

FIG. 3 illustrates certain aspects of an apparatus 300 that includes multiple devices 302, 320 and 322a-322n connected to a serial bus 330 that includes a clock wire 316 and a data wire 318. The devices 302, 320 and 322a-322n may include one or more semiconductor IC devices, such as an applications processor, SoC or ASIC. Each of the devices 302, 320 and 322a-322n may include, support or operate as a modem, a signal processing device, a display driver, a camera, a user interface, a sensor, a sensor controller, a media player, a transceiver, and/or other such components or devices. Communications between devices 302, 320 and 322a-322n over the serial bus 330 is controlled by a bus master device 320. Certain types of bus can support multiple bus master devices 320.

The apparatus 300 may include multiple devices 302, 320 and 322a-322n that communicate when the serial bus 330 is operated in accordance with I2C, I3C or other protocols. At least one device 302, 322a-322n may be configured to operate as a slave device on the serial bus 330. In one example, a slave device 302 may be adapted to provide a sensor control function 304. The sensor control function 304 may include circuits and modules that support an image sensor, and/or circuits and modules that control and communicate with one or more sensors that measure environmental conditions. The slave device 302 may include configuration registers 306 and/or other storage 324, control logic 312, a transceiver 310 and line drivers/receivers 314a and 314b. The control logic 312 may include a processing circuit such as a state machine, sequencer, signal processor or general-purpose processor. The transceiver 310 may include a receiver 310a, a transmitter 310c and common circuits 310b, including timing, logic and storage circuits and/or devices. In one example, the transmitter 310c encodes and transmits data based on timing in a signal (TXCLK 328) provided by a clock generation circuit 308.

Two or more of the devices 302, 320 and/or 322a-322n may be adapted according to certain aspects and features disclosed herein to support a plurality of different communication protocols over a common bus, which may include an I2C protocol, an I3C protocol, and/or another protocol. In some examples, devices that communicate using one protocol (e.g., an I2C protocol) can coexist on the same serial bus with devices that communicate using a second protocol (e.g., an I3C protocol). In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 330, in addition to data formats and aspects of bus control. In some aspects, the I2C and I3C protocols may define direct current (DC) characteristics affecting certain signal levels associated with the serial bus 330, and/or alternating current (AC) characteristics affecting certain timing aspects of signals transmitted on the serial bus 330.

Examples of Signaling on a Bus Operable for I2C Communications

Figure 4:
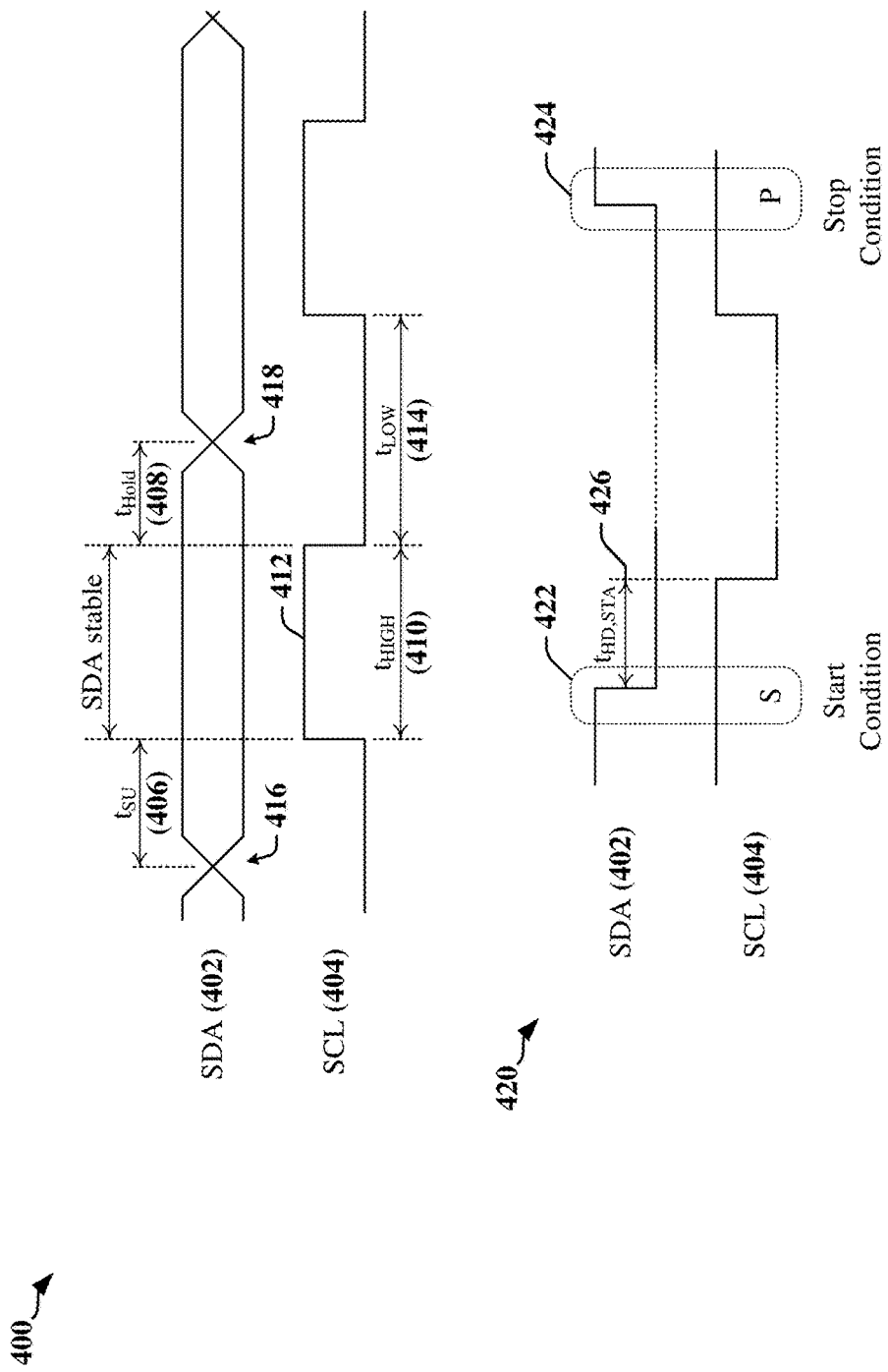
FIG. 4 includes timing diagrams that illustrate certain signal timing relationships between the wires on a conventional I2C bus.

FIG. 4 includes timing diagrams 400 and 420 that illustrate certain timing relationships between the SDA wire 402 and the SCL wire 404 on a conventional I2C bus. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

Specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 used between transactions, including data transmissions, executed on a conventional I2C bus. The I2C protocol provides for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A START condition 422 is defined to permit the current bus master to signal that data is to be transmitted. The START condition 422 occurs when the SDA wire 402 transitions from high to low while the SCL wire 404 is high. The I2C bus master initially transmits the START condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a STOP condition 424 is transmitted by the I2C master device. The STOP condition 424 occurs when the SDA wire 402 transitions from low to high while the SCL wire 404 is high. The I2C Specifications require that all transitions of the SDA wire 402 occur when the SCL wire 404 is low, and exceptions may be treated as a START condition 422 or a STOP condition 424.

A bus master may transmit a repeated start condition, which includes the signaling transitions defined for the START condition 422, in place of a STOP condition 424. The repeated start condition permits the bus master to string together a sequence of transactions without intervening STOP conditions 424 and idle periods before the next START condition 422.

Transactions initiated by a bus master over a serial bus may include transactions to read data from a specified slave device, transactions to write to a specified slave device and broadcast transactions to write to multiple devices. The bus master may initiate a transaction by transmitting a command word that includes an address or identifier (ID) of a slave or a broadcast address, with an indication of whether the transaction includes a device read or write.

Figure 5:
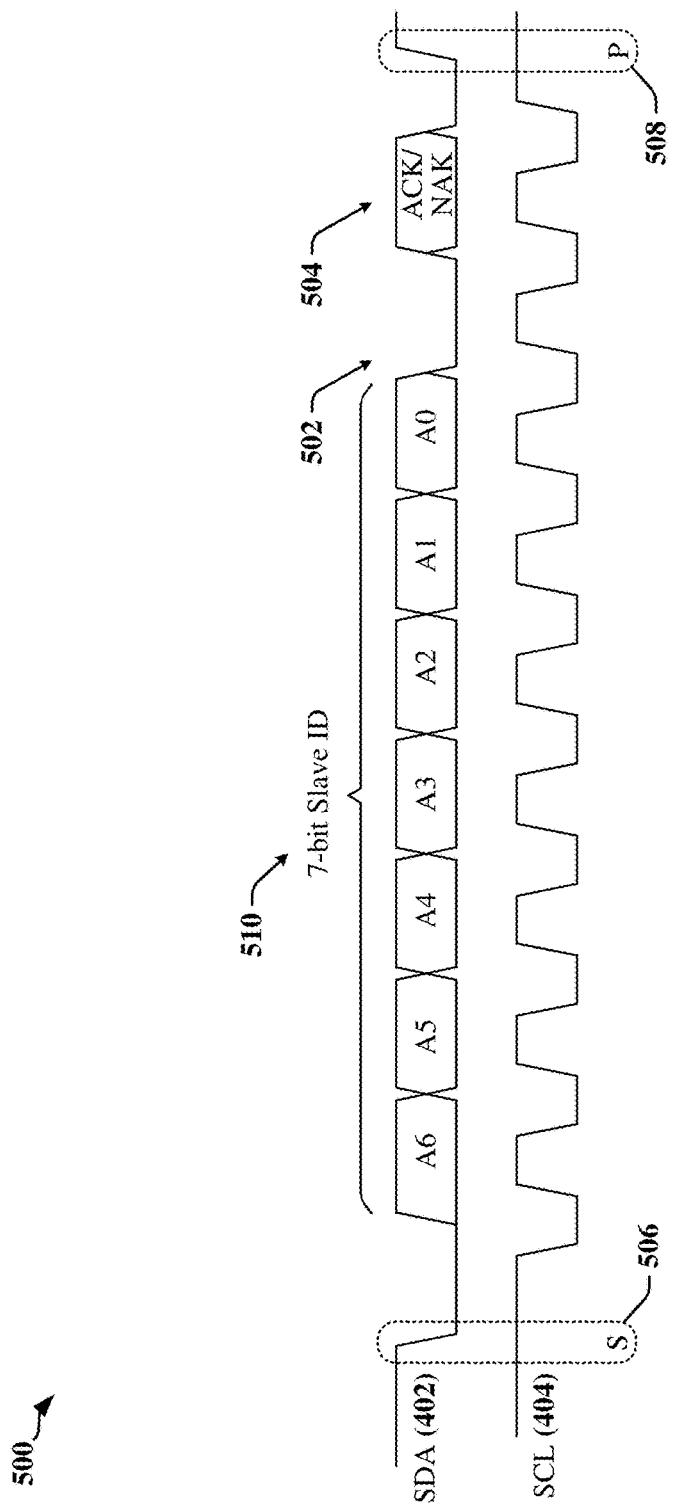
FIG. 5 is a diagram that illustrates an example of the timing associated with a command transmitted on a serial bus in accordance with I2C protocols.

FIG. 5 is a diagram that illustrates an example of the timing associated with a command 500 transmitted on a serial bus in accordance with I2C protocols. In the example, a bus master initiates the transaction with a START condition 506, whereby the SDA wire 402 is driven from high to low while the SCL wire 404 remains high. The bus master then transmits a clock signal on the SCL wire 404. A seven-bit Slave ID 510 is then transmitted on the SDA wire 402. The Slave ID 510 may be a unique address assigned to a slave address or a broadcast address that causes more than one slave device to respond to the command 500. The Slave ID 510 is followed by a Write/Read command bit 502, which indicates "Write" when low and "Read" when high. The addressed slave device may respond in the next clock interval 504 with an acknowledgment (ACK) by driving the SDA wire 402 low. If the addressed slave device does not respond, the SDA wire 402 is pulled high and the bus master treats the lack of response as a negative acknowledge (NACK). The bus master may terminate the transaction with a STOP condition 508 by driving the SDA wire 402 from low to high while the SCL wire 404 is high. The illustrated command 500 can be used to determine whether a slave device with the transmitted address coupled to the I2C bus is in an active state.

The bus master relinquishes control of the SDA wire 402 after transmitting the Write/Read command bit 502 to permit the slave device may transmit an acknowledgment (ACK) bit on the SDA wire 402. In some implementations, open-drain drivers are used to drive the SDA wire 402. When open-drain drivers are used, the SDA drivers in the bus master and the slave device may be active concurrently.

Transaction on a serial bus may include the transfer of one or more bytes of data. The data may be written to, or read from registers or other storage in the slave device that are directly addressable by the bus master. In some instances, registers may be mapped to storage locations in randomly accessible memory. The bus master may identify a first register to be written and may then send multiple bytes to be written, which are written to multiple registers by incrementing an address pointer or register after each write to a register. The bus master may identify a first register to be read and a number of registers to be read from the slave address.

Figure 6:
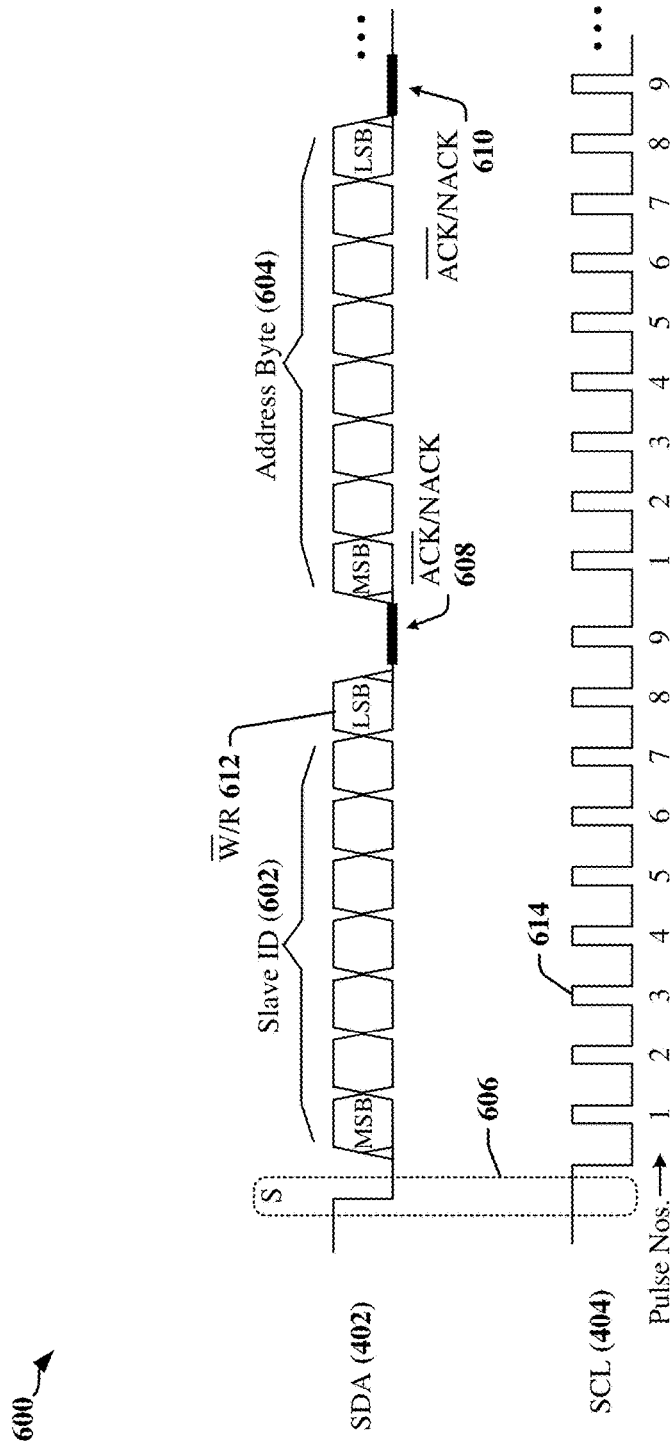
FIG. 6 is a timing diagram illustrating a transaction on a serial bus operated in accordance with an I2C protocol.

FIG. 6 is a timing diagram 600 illustrating a transaction in which a bus master addresses a register in a slave device for a single-byte or multiple byte read or write transaction. A bus master transmits a 7-bit Slave ID 602 on the SDA wire 402 (after the start condition 60) to indicate the slave device on an I2C bus that the bus master wishes to access, followed by a Read/Write bit 612 that indicates whether the operation is a read or a write operation. The Read/Write bit 612 is at logic 0 to indicate a write operation and at logic 1 to indicate a read operation. Except for a broadcast transaction, only the slave node whose ID matches the Slave ID 602 can respond to the write (or read) operation. The addressed slave device may respond in the next clock interval 608 with an acknowledgment (ACK) by driving the SDA wire 402 low. If the addressed slave device does not respond, the SDA wire 402 is pulled high and the bus master treats the lack of response as a negative acknowledge (NACK). A timing pulse 614 in the SCL wire 404 is transmitted with each bit in a transaction.

When a slave device has acknowledged receipt of its unique address in the Slave ID 602 field, the bus master may transmit one or more address bytes 604 to identify a register address to which data is to be written or which the bus master wishes to read. The addressed slave device may respond in the next clock interval 610 with an ACK by driving the SDA wire 402 low.

Examples of Single Byte and Multiple-Bit Transactions on a Serial Bus

Figure 7:
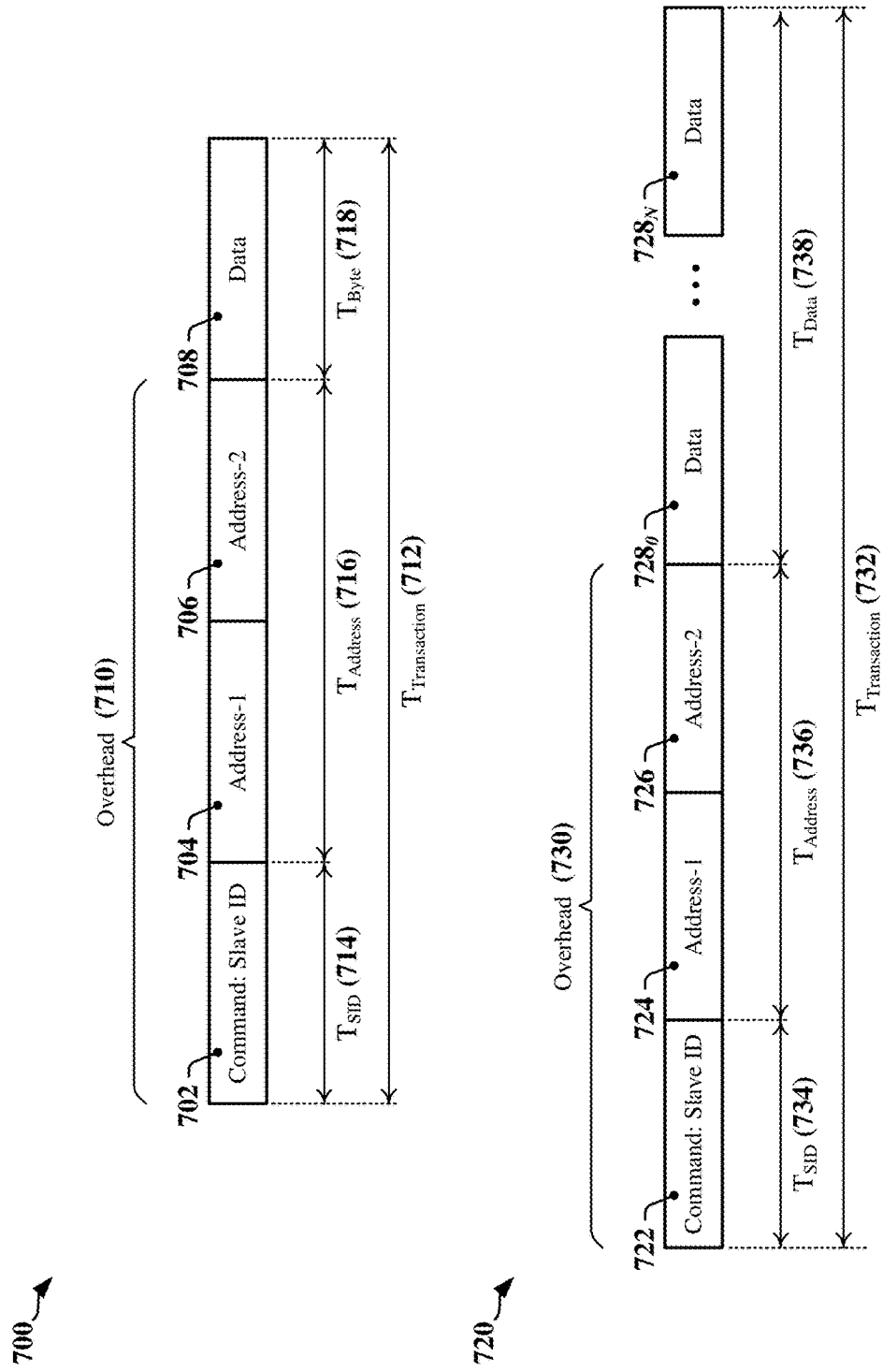
FIG. 7 illustrates certain I2C transactions that may be initiated by a bus master to write data to a selected slave device.

FIG. 7 illustrates transactions 700, 720 that may be initiated by a bus master to write data to a selected slave device. A single-byte write transaction 700 may be initiated when the bus master transmits a write command 702 with a Slave ID corresponding to the selected slave device. After the slave device has acknowledged the command, the master device may transmit an address of the register to be written during the transaction. In the example, the address of the register may be transmitted in two address bytes 704, 706. The slave device may acknowledge each of the two address bytes 704, 706. The master device may transmit a data byte 708 after the slave device has acknowledged the address of the register to be written. The transaction 700 may be terminated after the data byte 708 has been written.

The single-byte write transaction 700 involves the transmission of four bytes to cause a single byte to be written to the selected slave device. The transaction time 712 ($T_{Transaction}$) required to write the single byte includes a command period 714 ($T_{SID}$), which includes the start condition, an address period 716 ($T_{Address}$), and a data byte transmission period 718 ($T_{Byte}$). The transaction time 712 ($T_{Transaction}$) may also include a stop or repeated start transmission time ($T_{Term}$). The transaction time 712 and overhead 710 may be expressed as:

$$T_{Transaction} = T_{SID} + T_{Address} + T_{Byte} + T_{Term}$$

$$Overhead = T_{SID} + T_{Address} + T_{Term}$$

In some examples, $T_{SID} \approx T_{Address} \approx T_{Byte} \approx 25$ ms.

I2C and other protocols permit multiple data bytes to be sequentially written to registers in the slave device in one multi-byte write transaction 720. The data is written to registers commencing at a first identified register and one or more contiguous registers.

A multi-byte write transaction 720 may be initiated when the bus master transmits a write command 722 with a Slave ID corresponding to the selected slave device. After the slave device has acknowledged the command, the master device may transmit an address of the first register to be written during the transaction. In the example, the address of the register may be transmitted in two address bytes 724, 726. The slave device may acknowledge each of the two address bytes 724, 726. The master device may transmit two or more data bytes 728₀-728$_N$ after the slave device has acknowledged the address of the register to be written. The transaction 720 may be terminated after the data byte 728 has been written.

The multi-byte write transaction 720 employs four bytes of overhead that precedes the writing of two or more data bytes 728₀-728$_N$ to the selected slave device. The transaction time 732 ($T_{Transaction}$) required to write the single byte includes a command period 734 ($T_{SID}$), which includes the start condition, an address period 736 ($T_{Address}$), and a data byte transmission period 738 ($T_{Data}$). The transaction time 732 may also include a stop or repeated start transmission time ($T_{Term}$). The transaction time 732 ($T_{Transaction}$) and overhead 730 may be expressed as:

$$T_{Transaction} = T_{SID} + T_{Address} + T_{Data} + T_{Term}$$

$$Overhead = T_{SID} + T_{Address} + T_{Term}$$

In some examples, $T_{SID} \approx T_{Address} \approx T_{Byte} \approx 25$ ms.

The examples illustrated in FIG. 7 illustrate that the overhead per byte transmitted can be significantly reduced when multi-byte write transactions 720 are used instead of single-byte write transactions 700. Some applications that provide data to be transmitted over a serial bus may not be designed to take advantage of the efficiencies of multi-byte write transactions 720. In some instances, multiple applications that write registers of a common slave device may operate independently of one another. In some instances, threads or functions of a single application may write frequently to plural registers in a slave device in an uncoordinated manner Uncoordinated register data directed to one or more slave devices may arrive at the physical layer of a serial interface as single-byte writes.

Overhead 710, 730 in a serial interface may affect throughput and latency in a serial interface. The effect of overhead on throughput is greater for lower ratios of the number of data bytes to total number of bytes transmitted in a transaction. Latency is affected both by the number of overhead bytes transmitted before a data byte for which latency is measured and the time between successive transactions that can be attributed to software processes in the bus master. The combination of two or more single-byte write transactions 700 into one multi-byte write transactions 720 can prevent or eliminate some or all of the latencies arising from interrupt processing and other software or operating system functions associated with generating and executing a data transaction through a serial interface. In one example, interrupt processing and other operating system functions may introduce a 60 ms or more latency between successive transactions.

While multi-byte write transactions 720 defined by I2C and other protocols can decrease inter-transaction latency, some applications do not use multiple-byte write transactions. In some instances, multiple-byte write transactions are not suitable for use by applications or higher-level protocols. In some instances, implementation of multiple-byte write transactions in applications or higher-level protocols can increase application complexity. In one example, an application associated with a camera may generate a high rate of writes to registers that have addresses within a small address range in the slave, and the application may have multiple functions or threads that generate the single-byte write transactions 700 for a slave device. These multiple functions or threads may not interact with one another, may operate according to different timing, and/or may include persistent and non-persistent functions or threads that cause the application to produce uncoordinated streams of single-byte write transactions 700.

Figure 8:
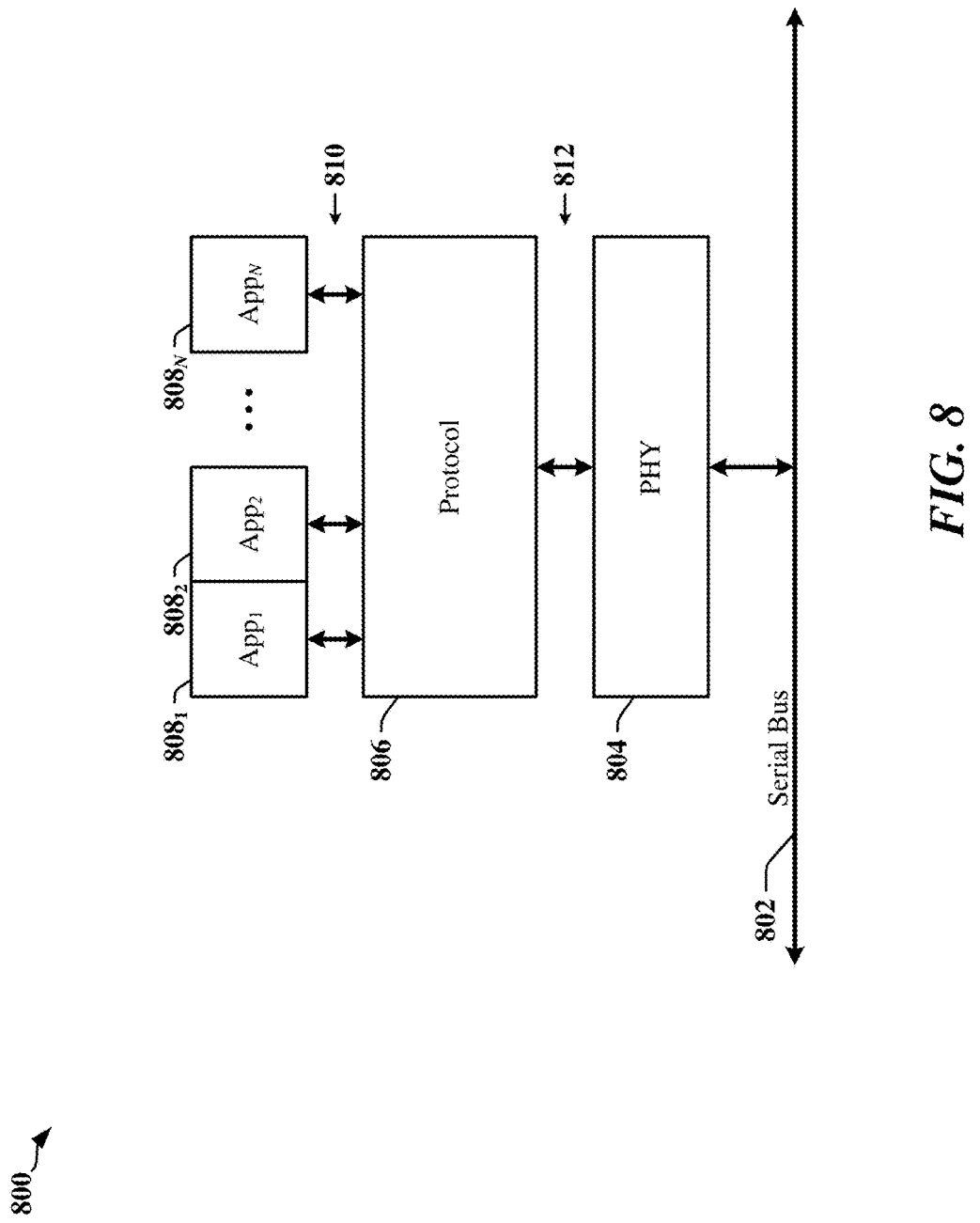
FIG. 8 illustrates an example of a processing environment in which one or more applications provide data to a protocol stack that routes and formats the data for communicating over a serial bus.

FIG. 8 illustrates an example of a processing environment 800 in which one or more applications 800₁, 800₂, ... 800$_N$ provide data 810 to a protocol stack 806 that routes and formats the data for communicating over a serial bus 802. For the purposes of writing registers in a slave device, a physical layer (PHY 804) receives transactions 812 from the protocol stack 806 and controls the physical circuits used to transmit data over the serial bus 802. The PHY 804 may generate start, repeated start, and stop signaling in accordance with an I2C protocol, and may handle acknowledgements and retransmissions, etc.

According to certain aspects disclosed herein, the PHY 804 may be adapted to compact, compress, aggregate or combine single-byte write transactions 700 in the transactions 812 received from the protocol stack 806 when the single-byte write transactions 700 are directed to two or more sequentially-addressed registers in a slave device. In one example, the PHY 804 may compact, compress, aggregate or combine two or more single-byte write transactions 700 received from the protocol stack 806 to obtain a multi-byte write transaction 720 that carries the data bytes from each of the compacted, compressed, combined or aggregated single-byte write transactions 700.

Compressing Transactions in a PHY of a Serial Interface

Figure 9:
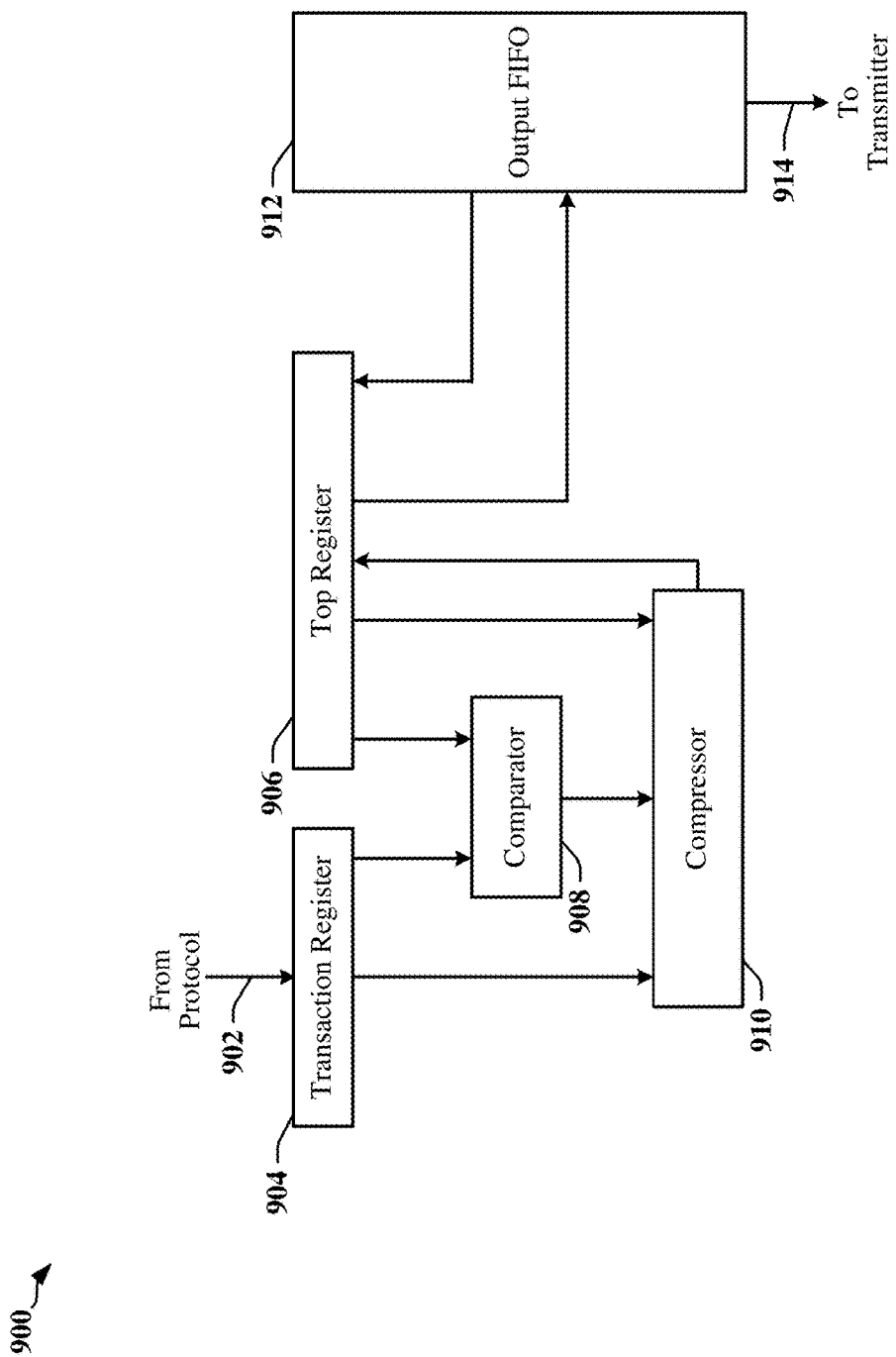
FIG. 9 illustrates a physical layer of a serial interface that may be adapted to compact, compress, aggregate or combine two or more single-byte write transactions in accordance with certain aspects disclosed herein.

FIG. 9 illustrates an example of an adaptation 900 to the PHY 804 that enables a device to compact, compress, aggregate or combine two or more single-byte write transactions 700 received from the protocol stack 806 to obtain a multi-byte write transaction 720. A transaction stream 902 that includes single-byte write transactions 700 generated by the protocol stack may be provided to a transaction register 904. A comparator 908 may compare addressing information in the transaction stored in the transaction register 904 with the immediately preceding transaction, which may be provided by a top register 906. The top register 906 may access the last transaction entered into a first-in-first-out register (FIFO 912), which provides an output 914 that feeds transmitter circuits that control transmissions on the serial bus. The top register 906 may maintain a copy of the last transaction entered into the FIFO 912, or may maintain a pointer to the address in the FIFO 912 at which the last-received for the last transaction entered into the FIFO 912 is stored. In one example, the comparator 908 may determine whether two consecutive transactions (i.e., the transaction stored in the transaction register 904 and the last transaction entered into the FIFO 912) are directed to the same slave address. The comparator 908 may then determine if the transaction stored in the transaction register 904 is directed to a register address that immediately follows the address of the last register to be written by the last transaction entered into the FIFO 912. If the two consecutive transactions are directed to the same slave address and the transactions involve consecutive registers, then the consecutive transactions may be combined to obtain a multi-byte transaction.

A compressor 910 may be provided to extract the data byte from the transaction stored in the transaction register 904 and append the extracted data byte to the last transaction entered into the FIFO 912 to obtain an extended multi-byte transaction. The extended multi-byte transaction may be provided to the top register 906, which may be configured to replace the last transaction entered into the FIFO 912 with the extended multi-byte transaction. The last transaction entered into the FIFO 912 can be extended further when one or more additional, suitable single-byte transactions are received in the transaction register 904.

Figure 10:
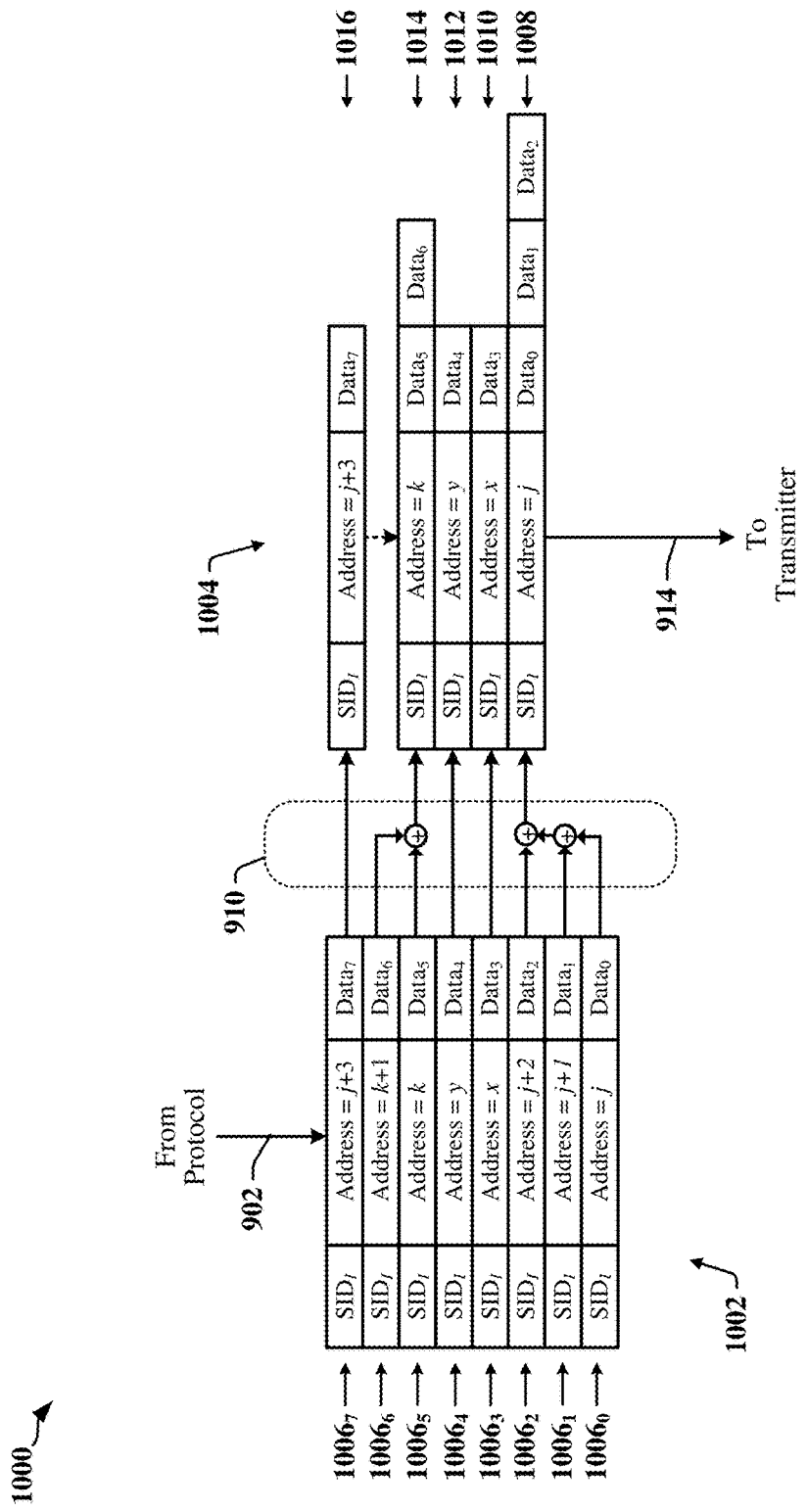
FIG. 10 is a data flow diagram that illustrates compaction, compression, aggregation or combination of a transaction stream that includes single-byte write transactions in accordance with certain aspects disclosed herein.

FIG. 10 is a data flow diagram 1000 that illustrates compaction, compression, aggregation or combination of a transaction stream 1002 that includes single-byte write transactions $1006_0$-$1006_7$. For the purposes of this example, it can be assumed that the FIFO 912 is empty when the first single-byte write transaction $1006_0$ is received, and that no transmission occurs until after the last illustrated single-byte write transaction $1006_7$ is received. Each single-byte write transaction $1006_0$-$1006_7$ is directed to the same slave address ($SID_f$). The first-received single-byte write transaction $1006_0$ is stored in the FIFO 912 through the operation of the top register 906. The comparator 908 may compare the register addresses in the second-received single-byte write transaction $1006_1$ with the last register address to be written by the last transaction entered into the FIFO 912 (here the first-received single-byte write transaction $1006_0$). The register address (j+1) in the second-received single-byte write transaction $1006_1$ is incrementally greater than the last register address (j) to be written by the last transaction entered into the FIFO 912, and the compressor 910 may replace the last transaction entered into the FIFO 912 with a combination of the second-received single-byte write transaction $1006_1$ with the last transaction entered into the FIFO 912.

The comparator 908 may compare the register addresses in the third-received single-byte write transaction $1006_2$ with the last register address to be written by the last transaction entered into the FIFO 912. The register address (j+2) in the third-received single-byte write transaction $1006_2$ is incrementally greater than the last register address (j+1) to be written by the last transaction entered into the FIFO 912, and the compressor 910 may replace the last transaction entered into the FIFO 912 with a combination of the second-received single-byte write transaction $1006_1$ with the last transaction entered into the FIFO 912. The content 1004 of the FIFO 912 may now include a first multi-byte write transaction 1008 that includes three data bytes.

The comparator 908 may compare the register addresses in the fourth-received single-byte write transaction $1006_3$ with the last register address to be written by the last transaction entered into the FIFO 912. The register address (x) in the fourth-received single-byte write transaction $1006_3$ is not incrementally greater than the last register address (j+2) to be written by the last transaction entered into the FIFO 912. The fourth-received single-byte write transaction $1006_3$ is added to the FIFO 912 as a single-byte write transaction 1010.

The comparator 908 may compare the register addresses in the fifth-received single-byte write transaction $1006_4$ with the last register address to be written by the last transaction entered into the FIFO 912. The register address (y) in the fifth-received single-byte write transaction $1006_4$ is not incrementally greater than the last register address (x) to be written by the last transaction entered into the FIFO 912. The fifth-received single-byte write transaction $1006_4$ is added to the FIFO 912 as a single-byte write transaction 1012.

The comparator 908 may compare the register addresses in the sixth-received single-byte write transaction $1006_5$ with the last register address to be written by the last transaction entered into the FIFO 912. The register address (k) in the sixth-received single-byte write transaction $1006_5$ is not incrementally greater than the last register address (y) to be written by the last transaction entered into the FIFO 912. The sixth-received single-byte write transaction $1006_5$ is added to the FIFO 912 as a single-byte write transaction.

The comparator 908 may compare the register addresses in the seventh-received single-byte write transaction $1006_6$ with the last register address to be written by the last transaction entered into the FIFO 912. The register address (k+1) in the seventh-received single-byte write transaction $1006_6$ is incrementally greater than the last register address (k) to be written by the last transaction entered into the FIFO 912, and the compressor 910 may replace the last transaction entered into the FIFO 912 with a combination of the seventh-received single-byte write transaction $1006_6$ with the last transaction entered into the FIFO 912. The content 1004 of the FIFO 912 may now include a second multi-byte write transaction 1014 that includes two data bytes.

The comparator 908 may compare the register addresses in the eighth-received single-byte write transaction $1006_7$ with the last register address to be written by the last transaction entered into the FIFO 912. The register address (j+3) in the eighth-received single-byte write transaction $1006_7$ is not incrementally greater than the last register address (k+1) to be written by the last transaction entered into the FIFO 912. The eighth-received single-byte write transaction $1006_7$ is added to the FIFO 912 as a single-byte write transaction 1016.

Adaptations of the PHY 804 in a device coupled to a serial bus, including the adaptations illustrated in FIGS. 9-10, can be used independently of other layers of a protocol stack 806 and applications to produce multi-byte write transactions 720 in accordance with I2C and other protocols. A PHY 804 adapted in accordance with certain aspects disclosed herein can operate without intervention, knowledge or control of upper-layer protocols and applications. The compaction, compression, aggregation or combination of single-byte write transactions 700 to obtain multi-byte write transactions 720 can reduce latency associated with transmission overhead, and can increase throughput of a serial interface, including when multiple transactions are executed for each start condition (i.e., through the use of repeated starts).

Reducing Software Latencies Associated with a Serial Bus

According to certain aspects, a PHY 804 may be adapted to reduce latencies associated with requests for data to be transmitted. In conventional systems, the PHY may access and/or receive data and/or transactions to be transmitted through interrupts, direct memory access procedures, and/or other software mechanisms. Delays, or gaps between transactions when the PHY 804 has no data to transmit may contribute to significant levels of software latency. In one example, the contribution of data access procedures can add more than 50 milliseconds of latency to data communication operations involving camera sensors.

The PHY 804 may be adapted to implement a virtual queue that can enable a serial communication interface to continue transmitting without stalling or halting to request data for transmission. That is, a FIFO 912 can maintain a minimum quantity of transactions to support continuous transmission over the serial bus. The adapted PHY 804 can request more transactions, which may typically be provided before the FIFO 912 has been emptied. The FIFO 912 may be implemented independently of other layers of a protocol stack 806 and applications to produce multi-byte write transactions 720 in accordance with I2C and other protocols. The virtual queue may be implemented in a PHY 804 and may operate without intervention, knowledge or control of upper-layer protocols and applications. For example, the PHY 804 may be adapted to send direct memory access (DMA) bus requests based on FIFO 912 occupancy levels and/or threshold fill levels for the FIFO 912. The PHY 804 may continue transmissions over the serial interface without operating system intervention.

Figure 11:
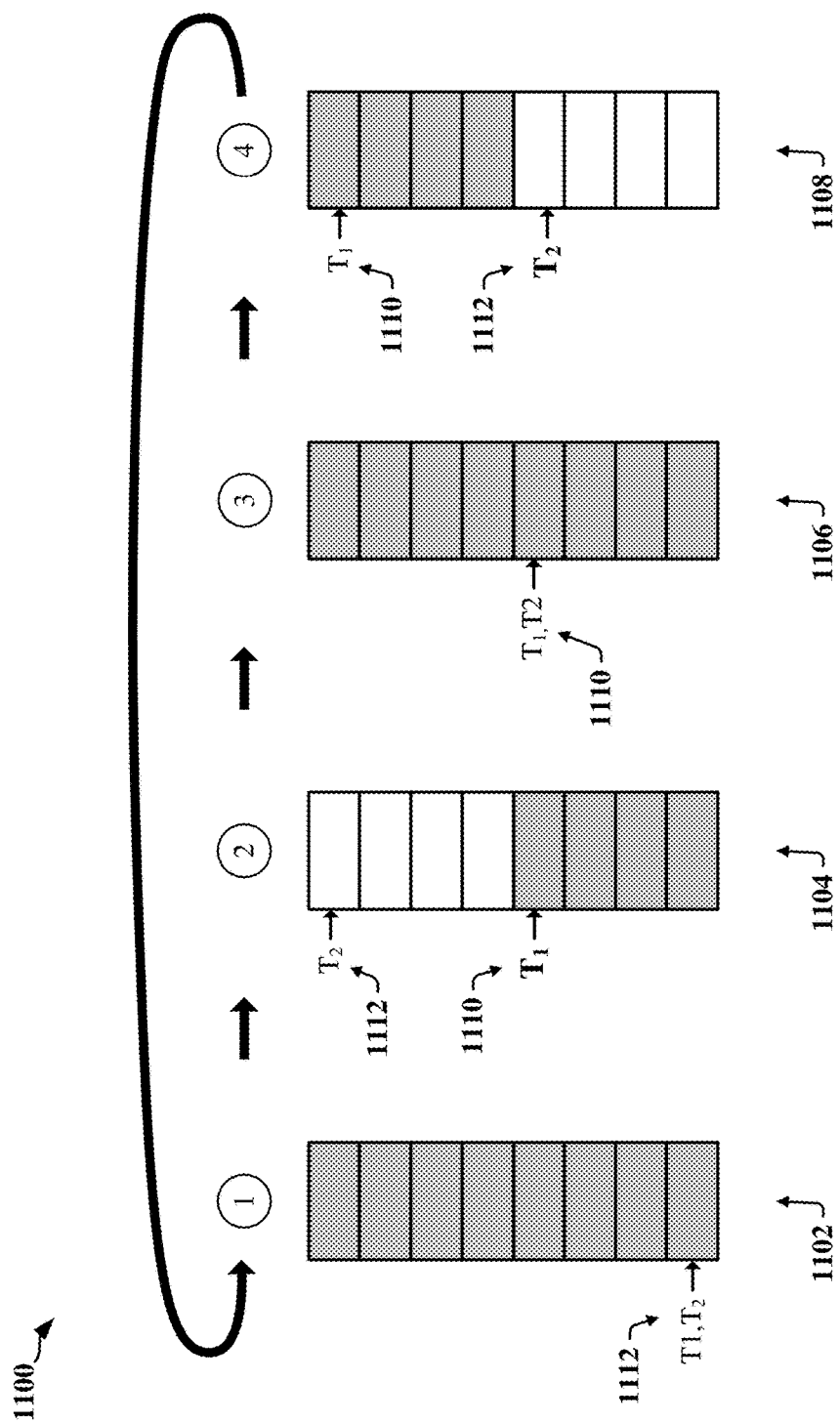
FIG. 11 is a state diagram that illustrates an example of the operation of a physical layer interface adapted in accordance with certain aspects disclosed herein.

FIG. 11 is a state diagram 1100 that illustrates an example of the operation of a FIFO 912 in a PHY 804 adapted in accordance with certain aspects disclosed herein. The FIFO 912 may store data and/or complete transactions to be transmitted over the serial bus. The FIFO 912 may be implemented as a ring buffer with one or more pointers. In the illustrated example, one pointer (the $T_1$ pointer 1110) may maintain the address of the next byte of data and/or transaction to be read, which may correspond to the address of the next byte of data and/or transaction transmitted. Another pointer (the $T_2$ pointer 1112) may be a write pointer that identifies the location at which the next byte of data and/or transaction arriving at the PHY 804 is to be stored in the FIFO 912. Certain flags may also be maintained or calculated based on status and/or activity of the FIFO 912. In one example, a FIFO_empty flag and/or a FIFO_full flag may be maintained to indicate whether data and/or transactions remains in the FIFO 912 when the $T_1$ pointer 1110 and the $T_2$ pointer 1112 point to the same address in the FIFO 912.

In a first state 1102, the FIFO 912 has been filled with transactions as the PHY 804 begins transmission on the serial bus. In the first state 1102, the $T_1$ pointer 1110 and the $T_2$ pointer 1112 point to the same address in the FIFO 912 and a FIFO_empty flag is cleared and/or a FIFO_full flag is set. After transmission of some transactions, the FIFO 912 is in a second state 1104 in which the $T_1$ pointer 1110 and the $T_2$ pointer 1112 point to different addresses. A FIFO_empty flag is cleared and/or a FIFO_full flag is cleared. In some examples, a threshold level for occupancy of the FIFO 912 may be defined such that, when the threshold is reached, the PHY 804 may be configured to initiate a data transfer through a DMA request, interrupt, or through another request mechanism. In response to the request for data, the FIFO 912 may enter the third state 1106 in which it has been refilled (or more completely filled in other examples). In the third state 1106, the $T_1$ pointer 1110 and the $T_2$ pointer 1112 point to the same address in the FIFO 912 and a FIFO_empty flag is cleared and/or a FIFO_full flag is set. After transmission of more transactions, the FIFO 912 enters a fourth state 1108, in which occupancy level of the FIFO 912 has fallen below the threshold level for occupancy of the FIFO 912. The PHY 804 may initiate another data transfer (through DMA request, interrupt, or another request mechanism) before returning to the first state 1102. In this example, the threshold level for occupancy of the FIFO 912 are set at 50% occupancy of the FIFO 912. The location and number of thresholds may be selected based on the size of the FIFO 912, rate at which the FIFO 912 is emptied, worst case software latency associated with loading the FIFO 912 and organization of the FIFO 912. In some examples, thresholds may be set to identify when the FIFO 912 is almost empty or almost full. Flags may be set or reset using logic that determines the number of empty or filled buffers in the FIFO 912.

In operation, DMA circuits in the PHY 804 may be configured to send a bus request (BR) when threshold level for occupancy of the FIFO 912 is reached. BRs may be sent until all transactions have been sent. Provided the FIFO 912 is not emptied, transactions can be executed without gaps or delays. In one example of an I2C interface operated at 400 KHz, the minimum time for transmitting one byte is 25 ms. In this example, the gap between I2C transactions may be minimized provided the FIFO 912 is re-loaded with a new I2C transaction within 25 ms.

The use of virtual queue can eliminate the latency that is involved with handling interrupts and/or DMA requests. Interrupt handling delay is unpredictable, and assertion of an interrupt can incur large delays during busy operations. The implementation of a virtual queue mechanism can enable continuous loading of transactions into the FIFO 912 without software intervention.

Examples of Processing Circuits and Methods

Figure 12:
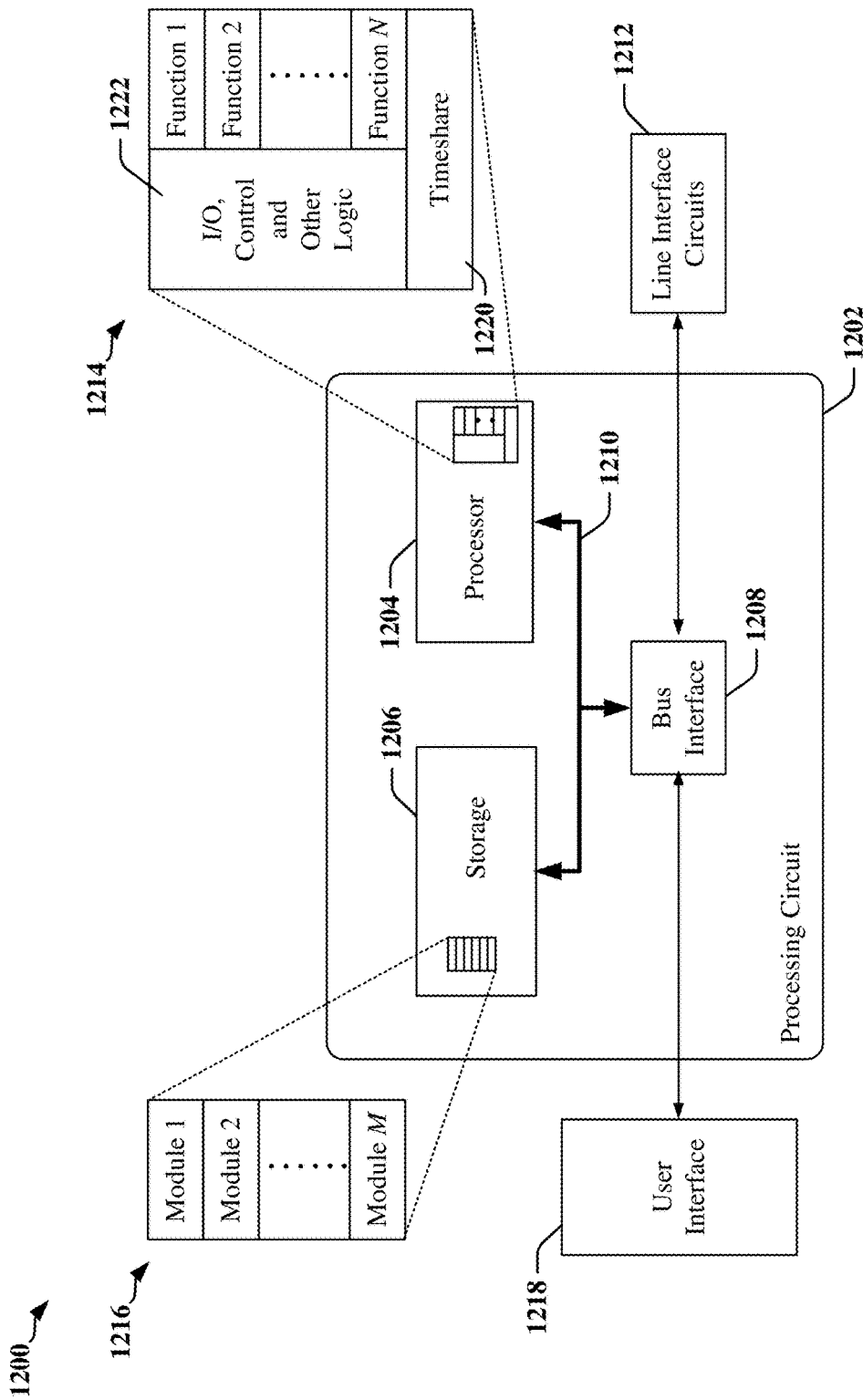
FIG. 12 is a block diagram illustrating an example of an apparatus employing a processing circuit that may be adapted according to certain aspects disclosed herein.

FIG. 12 is a diagram illustrating an example of a hardware implementation for an apparatus 1200 employing a processing circuit 1202 that may be configured to perform one or more functions disclosed herein. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation. In various examples, the processing circuit 1202 may be implemented using a state machine, sequencer, signal processor and/or general-purpose processor, or a combination of such devices and circuits.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212. A transceiver 1212 may be provided for each networking technology supported by the processing circuit. In some instances, multiple networking technologies may share some or all of the circuitry or processing modules found in a transceiver 1212. Each transceiver 1212 provides a means for communicating with various other apparatus over a transmission medium. Depending upon the nature of the apparatus 1200, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the transceiver 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the transceiver 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
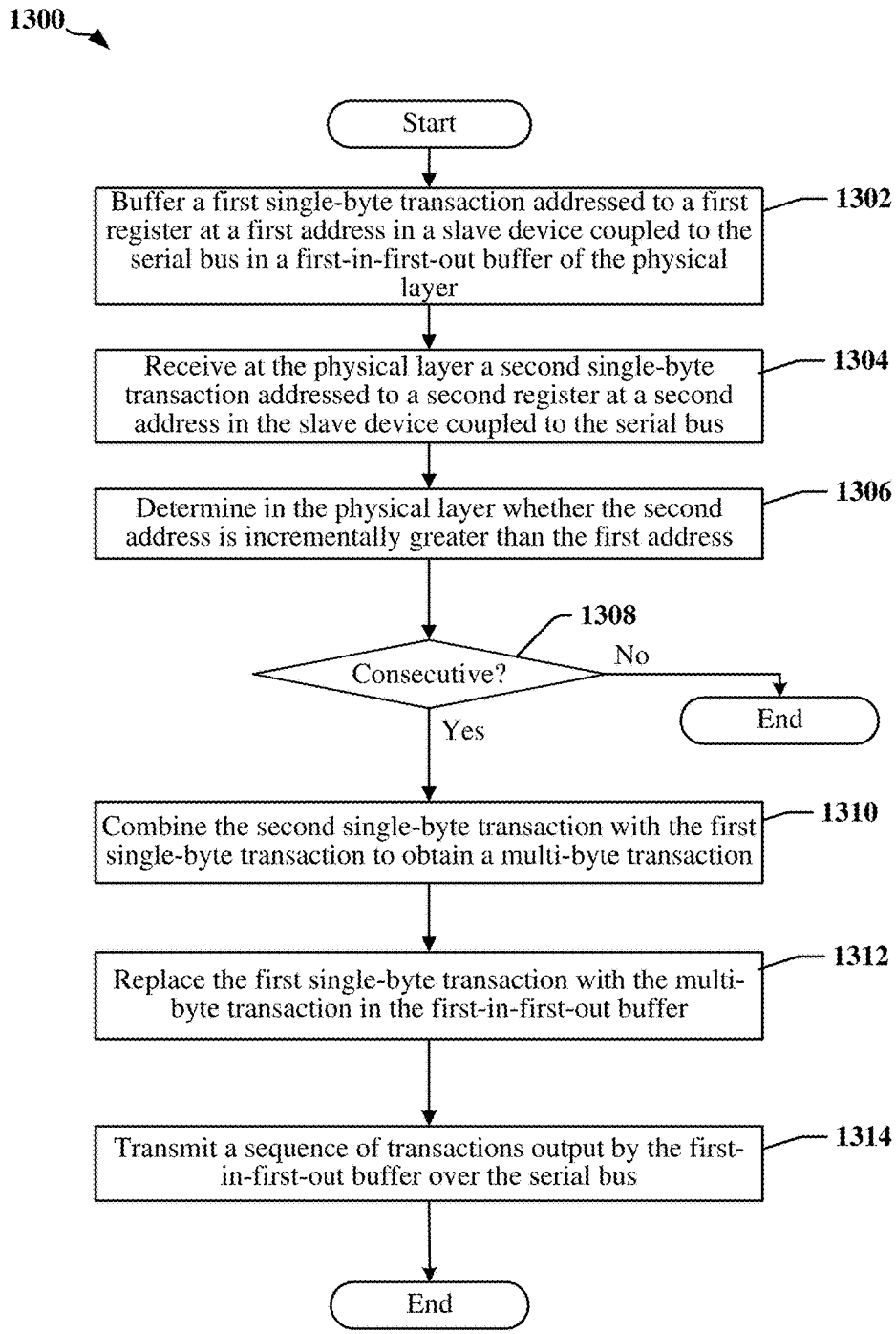
FIG. 13 is a flowchart illustrating the operation of a physical layer in a serial interface that may be adapted to compact, compress, aggregate or combine two or more single-byte write transactions in accordance with certain aspects disclosed herein.

FIG. 13 is a flowchart 1300 illustrating a method in which two or more single-byte write transactions 700 may be compacted, compressed, aggregated or combined to obtain a multi-byte write transaction 720 using a PHY 804 of a serial communication interface that has been adapted according to certain aspects disclosed herein.

At block 1302, the PHY 804 may buffer a first single-byte transaction addressed to a first register at a first address in a slave device coupled to the serial bus in a FIFO buffer of the physical layer.

At block 1304, the PHY 804 may receive a second single-byte transaction addressed to a second register at a second address in the slave device coupled to the serial bus.

At block 1306, the PHY 804 may determine whether the second address is incrementally greater than the first address.

If at block 1308, it is determined that the second address is not incrementally greater than the first address, then the first single-byte transaction may be unaltered based on receipt of the second single-byte transaction. If, however, it is determined that the second address is incrementally greater than the first address, then the process continues at block 1310.

At block 1310, the PHY 804 may combine the second single-byte transaction with the first single-byte transaction to obtain a multi-byte transaction.

At block 1312, the PHY 804 may replace the first single-byte transaction with the multi-byte transaction in the FIFO buffer.

At block 1314, the PHY 804 may transmit a sequence of transactions output by the FIFO buffer over the serial bus.

In some examples, the PHY 804 may receive a third single-byte transaction addressed to a third register at a third address in the slave device, determine whether the third address is incrementally greater than the second address, combine the third single-byte transaction with the multi-byte transaction to obtain an updated multi-byte transaction, and replace the multi-byte transaction with the updated multi-byte transaction in the FIFO buffer.

According to certain aspects, the PHY 804 may combine the second single-byte transaction with the first single-byte transaction by extracting a data byte from the second single-byte transaction, and appending the data byte to the first single-byte transaction. In some examples, the PHY 804 may retrieve a last-stored transaction stored in the FIFO buffer, append a data byte from at least one of two or more consecutive single-byte transactions to the last-stored transaction to obtain the multi-byte transaction or the updated multi-byte transaction, and store the multi-byte transaction or the updated multi-byte transaction in the FIFO buffer.

In one example, the serial bus is operated in accordance with an I2C protocol.

In various examples, the PHY 804 may initiate a request for data when an occupancy level of the FIFO buffer falls below a threshold occupancy level. The PHY 804 may initiate the request for data by issuing a bus request to a DMA controller. The PHY 804 may initiate the request for data by asserting an interrupt request.

Figure 14:
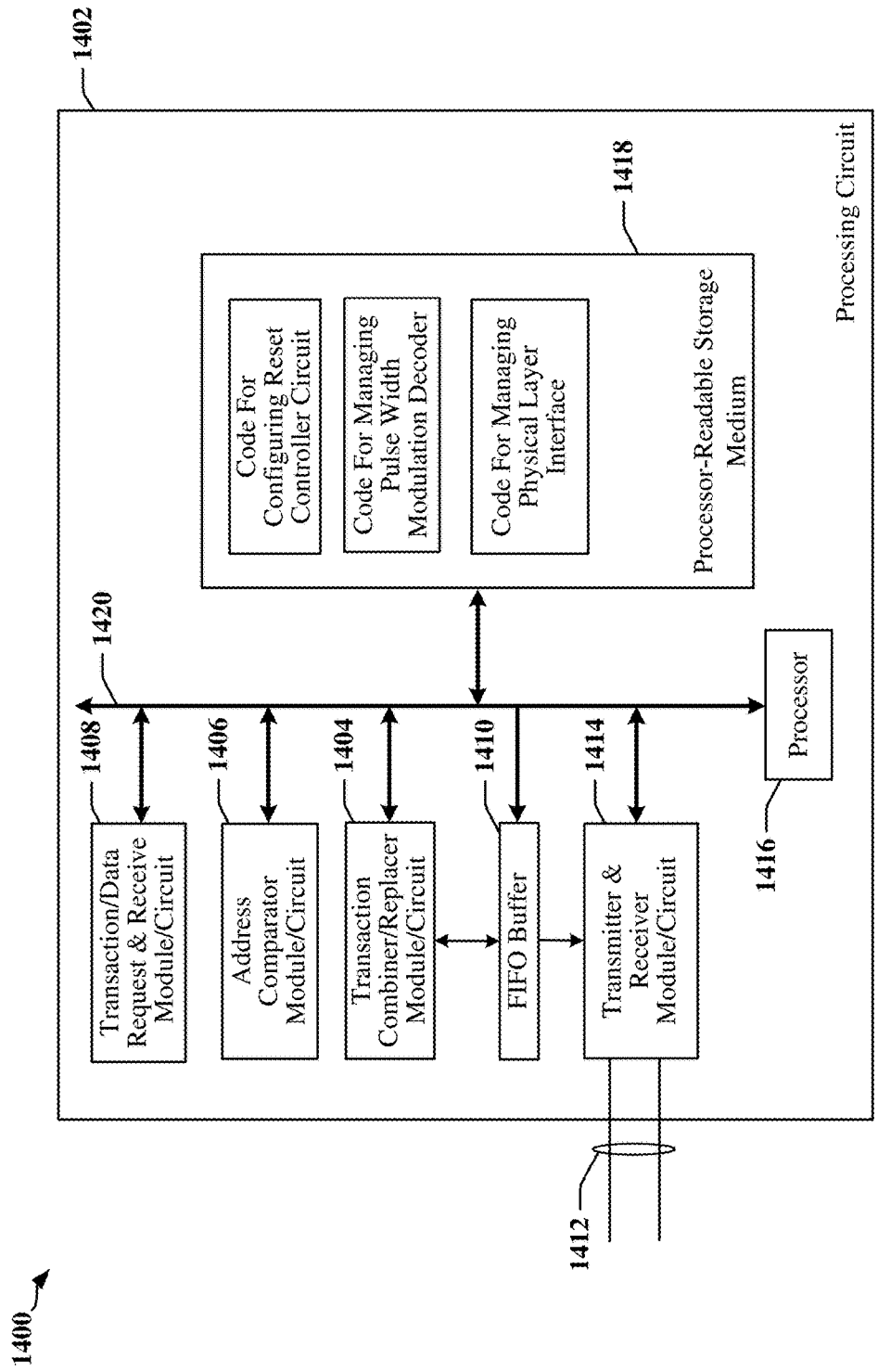
FIG. 14 illustrates a hardware implementation for a slave apparatus that includes a physical layer adapted to compact, compress, aggregate or combine two or more single-byte write transactions in accordance with certain aspects disclosed herein.

FIG. 14 is a diagram illustrating a simplified example of a hardware implementation for an apparatus 1400 employing a processing circuit 1402. The processing circuit typically has a processor 1416 that may be implemented using one or more microprocessors, microcontrollers, digital signal processors, sequencers, state machines and/or logic circuits. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the controller or processor 1416, the modules or circuits 1404, 1406, 1408 and 1410, and the computer-readable storage medium 1418. The apparatus may be coupled to a multi-wire communication link using a transmitter and/or receiver circuit 1414. The transmitter and/or receiver circuit 1414 may operate the multi-wire communication link (serial bus 1412) to support communications in accordance with an I2C protocol, an I3C protocol and/or another protocol. The bus 1420 may also link various other circuits such as timing sources, peripherals, voltage regulators, and power management circuits, which are well known in the art, and therefore, will not be described any further.

The processor 1416 is responsible for general processing, including the execution of software, code and/or instructions stored on the computer-readable storage medium 1418. The computer-readable storage medium may include a non-transitory storage medium. The software, when executed by the processor 1416, causes the processing circuit 1402 to perform the various functions described supra for any particular apparatus. The computer-readable storage medium may be used for storing data that is manipulated by the processor 1416 when executing software. The processing circuit 1402 further includes at least one of the modules 1404, 1406, 1408 and 1410. The modules 1404, 1406, 1408 and 1410 may be software modules running in the processor 1416, resident/stored in the computer-readable storage medium 1418, one or more hardware modules coupled to the processor 1416, or some combination thereof. The modules 1404, 1406, 1408 and 1410 may include microcontroller instructions, state machine configuration parameters, or some combination thereof.

In one configuration, the apparatus 1400 includes modules and/or circuits adapted to operate and/or control a FIFO buffer 1410, and modules and/or circuits 1408 adapted to receive. Maintain or access data and/or transactions. In one example, the modules and/or circuits 1408 may include a transaction register 904 configured to receive single-byte transactions from upper level protocols to be transmitted over a serial bus 1412. In another example, the modules and/or circuits 1408 may include a top register 906 configured to output a copy of an output transaction stored in the FIFO buffer. The apparatus 1400 includes modules and/or circuits 1406 adapted to compare addresses in transaction and configured to determine when the output transaction is directed to a first address in a slave device coupled to the serial bus 1412 and the first single-byte transaction is directed to a second address in the slave device that is incrementally greater than the first address. The apparatus 1400 may include compressor modules and/or circuits 1404 configured to generate an updated output transaction by combining the output transaction with the first single-byte transaction, and to cause the output transaction in the FIFO buffer 1410 to be replaced by the updated output transaction. The apparatus 1400 may include a transmitter and/or receiver circuit 1414 configured to transmit a sequence of transactions output by the FIFO buffer 1410 in signaling on the serial bus 1412.

In one example, the compressor modules and/or circuits 1404 may be configured to extract a data byte from the second single-byte transaction, and append the data byte to the first single-byte transaction to obtain the updated output transaction. In some examples, the compressor modules and/or circuits 1404 may be configured to retrieve a last-stored transaction stored in the FIFO buffer 1410, append a data byte from at least one of two or more consecutive single-byte transactions to the last-stored transaction to obtain the multi-byte transaction or the updated multi-byte transaction, and store the multi-byte transaction or the updated multi-byte transaction in the FIFO buffer 1410.

In one example, the compressor modules and/or circuits 1404 may be configured to generate a second updated output transaction by combining the updated output transaction with a third single-byte transaction when the comparator has determined that the third single-byte transaction is addressed to a third register at a third address in the slave device that is incrementally greater than the second address, and cause the output transaction in the FIFO buffer 1410 to be replaced by the second updated output transaction.

In certain examples, the serial bus 1412 is operated in accordance with an I2C protocol.

In various examples, the apparatus includes a DMA circuit configured to initiate a request for data when an occupancy level of the first-in-first-out buffer falls below a threshold occupancy level. The request for data may include a bus request to a DMA controller. The request for data may include an interrupt request.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a physical layer interface in a master device coupled to a serial bus, comprising:
    buffering a first single-byte transaction addressed to a first register at a first address in a slave device coupled to the serial bus in a first-in-first-out buffer of the physical layer interface;
    receiving at the physical layer interface a second single-byte transaction addressed to a second register at a second address in the slave device coupled to the serial bus;
    determining in the physical layer interface whether the second address is incrementally greater than the first address;
    combining the second single-byte transaction with the first single-byte transaction to obtain a multi-byte transaction;
    replacing the first single-byte transaction with the multi-byte transaction in the first-in-first-out buffer; and
    transmitting a sequence of transactions output by the first-in-first-out buffer over the serial bus.

2. The method of claim 1, further comprising:
    receiving at the physical layer interface a third single-byte transaction addressed to a third register at a third address in the slave device;
    determining in the physical layer interface whether the third address is incrementally greater than the second address;
    combining the third single-byte transaction with the multi-byte transaction to obtain an updated multi-byte transaction; and
    replacing the multi-byte transaction with the updated multi-byte transaction in the first-in-first-out buffer.

3. The method of claim 1, wherein combining the second single-byte transaction with the first single-byte transaction comprises:
    extracting a data byte from the second single-byte transaction; and
    appending the data byte to the first single-byte transaction.

4. The method of claim 1, wherein the serial bus is operated in accordance with an Inter-Integrated Circuit (I2C) protocol.

5. The method of claim 1, further comprising:
    initiating a request for data when an occupancy level of the first-in-first-out buffer falls below a threshold occupancy level.

6. The method of claim 5, wherein initiating the request for data comprises:
    issuing a bus request to a direct memory access (DMA) controller.

7. The method of claim 5, wherein initiating the request for data comprises:
    asserting an interrupt request.

8. An apparatus adapted to implement a physical layer of a serial interface, comprising:
    a first-in-first-out buffer;
    a first register configured to receive single-byte transactions to be transmitted over a serial bus;
    a second register configured to output a copy of an output transaction stored in the first-in-first-out buffer;
    a comparator configured to determine when the output transaction is directed to a first address in a slave device coupled to the serial bus and a first single-byte transaction is directed to a second address in the slave device that is incrementally greater than the first address;
    a compressor configured to:
        generate an updated output transaction by combining the output transaction with the first single-byte transaction; and
        cause the output transaction in the first-in-first-out buffer to be replaced by the updated output transaction; and
    a transmitter configured to transmit a sequence of transactions output by the first-in-first-out buffer in signaling on the serial bus.

9. The apparatus of claim 8, wherein the compressor is configured to:
    extract a data byte from the first single-byte transaction; and append the data byte to the output transaction to obtain the updated output transaction.

10. The apparatus of claim 8, wherein the compressor is configured to:
generate a second updated output transaction by combining the updated output transaction with a third single-byte transaction when the comparator has determined that the third single-byte transaction is directed to a third address in the slave device that is incrementally greater than the second address; and
cause the updated output transaction in the first-in-first-out buffer to be replaced by the second updated output transaction.

11. The apparatus of claim 8, wherein the serial bus is operated in accordance with an Inter-Integrated Circuit (I2C) protocol.

12. The apparatus of claim 8, further comprising:
a direct memory access (DMA) circuit configured to initiate a request for data when an occupancy level of the first-in-first-out buffer falls below a threshold occupancy level.

13. The apparatus of claim 12, wherein the request for data comprises:
a bus request to a direct memory access (DMA) controller.

14. The apparatus of claim 12, wherein the request for data comprises:
an interrupt request.

15. An apparatus comprising:
means for buffering single-byte transactions addressed to one or more slave devices coupled to a serial bus, the means for buffering including a first-in-first-out buffer in a physical layer interface adapted to couple the apparatus to the serial bus;
means for determining whether two or more consecutive single-byte transactions received by the means for buffering are addressed to consecutive register addresses in a first slave device coupled to the serial bus;
means for combining the two or more consecutive single-byte transactions to obtain a multi-byte transaction; and
means for transmitting the multi-byte transaction over the serial bus.

16. The apparatus of claim 15, wherein the means for buffering is configured to:
replace at least one of the two or more consecutive single-byte transactions in the first-in-first-out buffer with the multi-byte transaction.

17. The apparatus of claim 15, wherein the means for combining the two or more consecutive single-byte transactions is configured to:
retrieve a first transaction stored in the first-in-first-out buffer;
append a data byte from at least one of the two or more consecutive single-byte transactions to the first transaction to obtain the multi-byte transaction; and
store the multi-byte transaction in the first-in-first-out buffer.

18. The apparatus of claim 15, wherein the serial bus is operated in accordance with an Inter-Integrated Circuit (I2C) protocol.

19. The apparatus of claim 15, further comprising:
means for initiating a request for data when an occupancy level of the first-in-first-out buffer falls below a threshold occupancy level.

20. The apparatus of claim 19, wherein the means for initiating the request for data is configured to:
issue a bus request to a direct memory access (DMA) controller.

21. The apparatus of claim 19, wherein the means for initiating the request for data is configured to:
assert an interrupt request.

22. A non-transitory computer-readable medium having one or more instructions which, when executed by at least one processing circuit, cause the at least one processing circuit to:
buffer a first single-byte transaction addressed to a first register at a first address in a slave device coupled to a serial bus in a first-in-first-out buffer of a physical layer interface;
receive at the physical layer interface a second single-byte transaction addressed to a second register at a second address in the slave device coupled to the serial bus;
determine in the physical layer interface whether the second address is incrementally greater than the first address;
combine the second single-byte transaction with the first single-byte transaction to obtain a multi-byte transaction;
replace the first single-byte transaction with the multi-byte transaction in the first-in-first-out buffer; and
transmit a sequence of transactions output by the first-in-first-out buffer over the serial bus.

23. The non-transitory computer-readable medium of claim 22, further comprising instructions that cause the at least one processing circuit to:
receive at the physical layer interface a third single-byte transaction addressed to a third register at a third address in the slave device;
determine in the physical layer interface whether the third address is incrementally greater than the second address;
combine the third single-byte transaction with the multi-byte transaction to obtain an updated multi-byte transaction; and
replace the multi-byte transaction with the updated multi-byte transaction in the first-in-first-out buffer.

24. The non-transitory computer-readable medium of claim 22, further comprising instructions that cause the at least one processing circuit to:
extract a data byte from the second single-byte transaction; and
append the data byte to the first single-byte transaction.

25. The non-transitory computer-readable medium of claim 22, wherein the serial bus is operated in accordance with an Inter-Integrated Circuit (I2C) protocol.

26. The non-transitory computer-readable medium of claim 22, further comprising instructions that cause the at least one processing circuit to:
initiate a request for data when an occupancy level of the first-in-first-out buffer falls below a threshold occupancy level.

27. The non-transitory computer-readable medium of claim 22, further comprising instructions that cause the at least one processing circuit to:
issue a bus request to a direct memory access (DMA) controller to initiate a transfer of data.

28. The non-transitory computer-readable medium of claim 22, further comprising instructions that cause the at least one processing circuit to:
assert an interrupt request to initiate a transfer of data.

* * * * *